United States Patent
Lee (10) Patent No.: US 9,491,014 B1
(45) Date of Patent: Nov. 8, 2016

(54) COMPACT DUTY MODULATOR

(71) Applicant: Alpha and Omega Semiconductor Incorporated, Sunnyvale, CA (US)

(72) Inventor: Gilbert S. Z. Lee, Saratoga, CA (US)

(73) Assignee: ALPHA AND OMEGA SEMICONDUCTOR INCORPORATED, Sunnyvale, CA (US)

( * ) Notice: Subject to any disclaimer, the term of this patent is extended or adjusted under 35 U.S.C. 154(b) by 0 days.

(21) Appl. No.: 14/863,176

(22) Filed: Sep. 23, 2015

(51) Int. Cl.
*H04L 25/49* (2006.01)

(52) U.S. Cl.
CPC .................. *H04L 25/4902* (2013.01)

(58) Field of Classification Search
CPC ........................................ H04L 25/49
See application file for complete search history.

(56) References Cited

U.S. PATENT DOCUMENTS

| | | | |
|---|---|---|---|
| 5,156,005 A * | 10/1992 | Redlich | F02G 1/0435 318/811 |
| 7,224,199 B1 * | 5/2007 | Kang | H03K 5/131 327/175 |
| 8,692,477 B1 | 4/2014 | Lee | |
| 9,106,075 B2 | 8/2015 | Tomas et al. | |
| 2014/0241414 A1 * | 8/2014 | Reidl | H04L 25/4904 375/238 |
| 2014/0268939 A1 | 9/2014 | Tomas et al. | |
| 2014/0277802 A1 | 9/2014 | Tomas et al. | |
| 2015/0311780 A1 | 10/2015 | Tomas et al. | |

* cited by examiner

*Primary Examiner* — Jaison Joseph
(74) *Attorney, Agent, or Firm* — Joshua D. Isenberg; JDI Patent (57) ABSTRACT

Switching logic receives an input signal and a frequency divided signal and generates switching signals. A delay modulator receives the switching signals and generates a high output when a first node voltage is greater than a second node voltage and low output otherwise. An XOR gate receives the delay modulator's output and the frequency divided signal and produces a final output that is high when one of them is low and the other high and low otherwise. A duty ratio of the final output depends on a ratio of a slope of the first node voltage to a slope of the second node voltage.

22 Claims, 7 Drawing Sheets

COMPACT DUTY MODULATOR

FIELD OF THE INVENTION

Aspects of the present disclosure generally relate to and more particularly to pulse width modulation (PWM) and more particularly to pulse width modulation with variable duty cycle.

BACKGROUND OF THE INVENTION

Many electronic devices use a Pulse Width Modulation (PWM) signal to control or regulate their outputs. A PWM signal can be modulated by varying the signal frequency and/or duty ratio. This kind modulation often uses complicated algorithms and often requires sophisticated circuits that can take up significant real estate on a device chip.

Dual phase electronic devices share a given PWM period that is divided into two phases. According to the design purpose, the divided time could be overlapped or non-overlapped. For example, in case of a (half) bridge converter certain switches must be non-overlapped to prevent an undesired short-through between upper and the lower switches. An LLC converter has a half bridge configuration on the primary side and the upper and lower switches share its switching period evenly. That is, each switch has a 50% duty ratio to its switching period. Also, the twin rectifiers, e.g., Schottky diodes or Synchronous Rectifiers, on the secondary side of an LLC converter follow the primary switching frequency and commutate in an alternating fashion while their operation time is the same each other.

However, when switches turn-on or turn-off there is a turn-on or turn-off delay, which may include a rising or falling time and propagation delay. Thus, if the switches have the same 50% duty ratio the secondary rectifiers cannot help turning on at once in a short time during commutating. Therefore, their each maximum duty ratio should be less than 50%.

In circuits for which a secondary side rectifier synchronizes with a primary side circuit and receives period and duty information from the primary side it is not difficult to modulate the on/off switching of the primary and secondary sides. However, if the secondary side cannot get duty information from the primary side, duty ratio modulation is necessary because the secondary side rectifier switch can never know when the primary side rectifier switch turns on or off. Therefore, in order to ensure enough dead time to avoid turning both switches on at the same time it is necessary to monitor the PWM frequency and duty information and generate a proper turn-on time.

Examples of circuits for which the secondary cannot receive duty information from the primary include flyback circuits commonly used in low power applications (less than 100 W). For higher power applications, e.g., 100-200 W, an LLC circuit may be used, e.g., in a switching mode power supply (SMPS) for television, monitor, personal computers, and the like. In the case of an LLC circuit, one often needs to know when to turn off a switch in the LLC secondary side. To do this the secondary needs to receive information about the primary side switching frequency and duty ratio. However, because the primary and secondary are isolated by a transformer the secondary cannot receive the primary side switching frequency or the duty ratio without additional application. Also, in an LLC application, the resonant switching frequency has a variation. Furthermore, in most applications, the resonant frequency of an LLC circuit may vary considerably according to operating conditions. In such applications it is quite difficult to add an appropriate delay or lead time against those kinds of variation in the LLC using conventional duty modulation. As used herein, "delay" means that an action is done after an expected event and "lead" means that an action is done before the expected event.

Figure 1A:
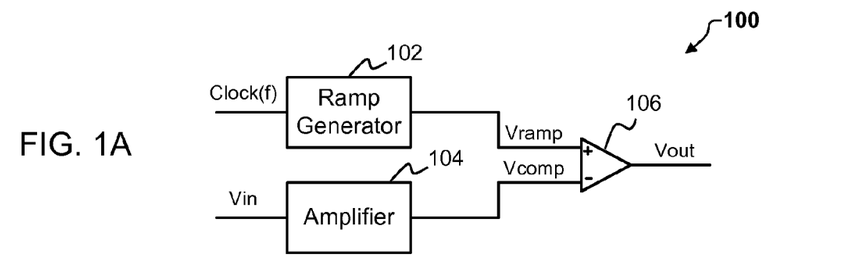
FIG. 1A is a schematic diagram of a conventional duty modulator.
Figure 1B:
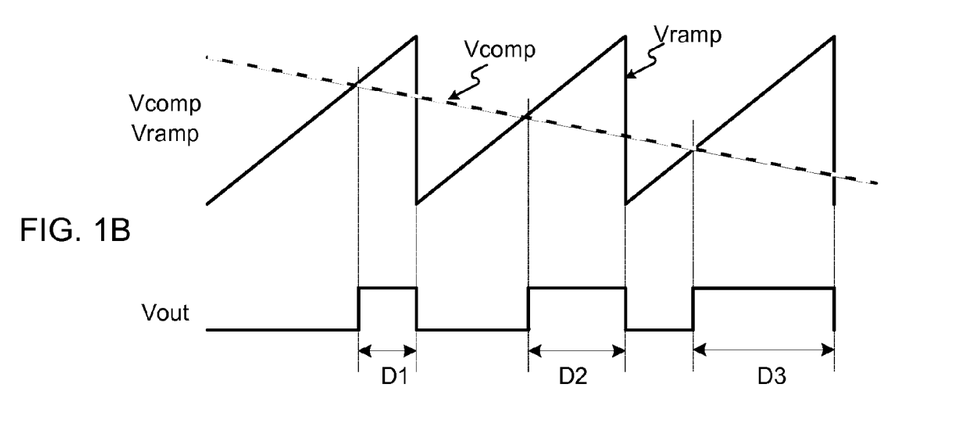
FIG. 1B is a timing diagram illustrating different duty ratios according to different voltage levels in the conventional duty modulator of FIG. 1A.

FIG. 1A depicts a conventional duty modulator 100 having a ramp signal generator 102, an amplifier 104 and a comparator 106. The ramp signal generator 102 generates a triangular or sawthooth Vramp waveform based on a clock signal having a clock frequency f as shown in FIG. 1B. The amplifier 104 provides gain to an input signal Vin to generate a comparison signal Vcomp. The comparator compares Vramp to Vcomp and generates an output signal Vout. In this example, Vout goes "high" if Vramp is larger than Vcomp and goes "low" if Vcomp is larger than Vramp.

Figure 2:
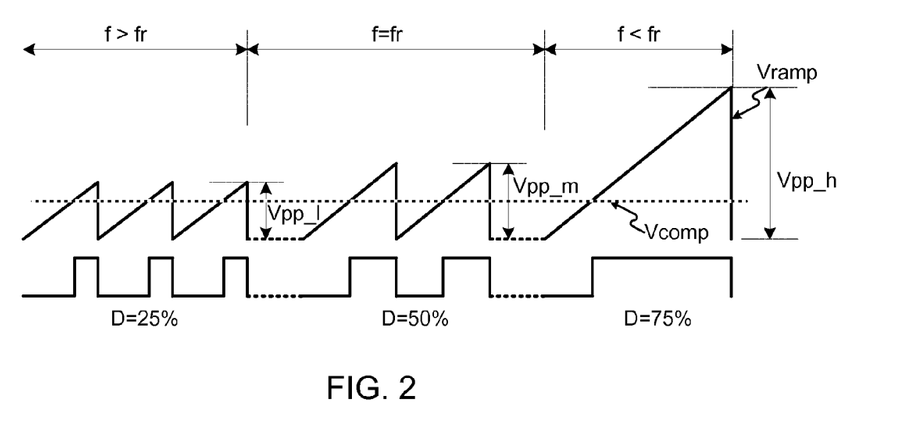
FIG. 2 is a timing diagram illustrating duty ratio variation due to frequency change in a conventional duty modulator of the type shown in FIG. 1A.

This type of conventional duty modulator can convert the input voltage signal Vin into time domain duty information. For successful Voltage-Time conversion the clock frequency f should be constant. However, if the clock frequency f used to trigger the ramp signal Vramp is a PWM signal for which the PWM frequency varies the output duty cannot be stable. FIG. 2 illustrates how the duty varies due to frequency change. If the frequency f varies, the Ramp generator generates a ramp signal with different peak heights, e.g., Vpp_l, Vpp_m, Vpp_h, because the slope of the ramp signal Vramp is fixed. However, if the Vcomp level is also fixed, the duty ratio of the output signal Vout changes. It is quite difficult to change the Vcomp level for duty to be constant because converting from frequency to voltage requires additional circuits, such as a phase locked loop (PLL).

It is within this context that aspects of the present disclosure arise.

BRIEF DESCRIPTION OF THE DRAWINGS

Objects and advantages of aspects of the present disclosure will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the aspects of the disclosure described below are set forth without any loss of generality to, and without imposing limitations upon, the claimed invention.

In the following detailed description, reference is made to the accompanying drawings, which form a part hereof, and in which is shown by way of illustration specific embodiments in which the invention may be practiced. In this regard, directional terminology, such as "top," "bottom," "front," "back," "first," "second," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

INTRODUCTION

Aspects of the present disclosure are directed to a Duty Modulator (DM) for which a PWM duty cycle may be modulated independent of operating switching frequency.

Aspects of the present disclosure include a very compact and stable apparatus that can modulate a PWM duty ratio from 0% to 100% without regard to any frequency.

According to some implementations, a delay may be easily added or modified even if there is a big operating frequency change. Certain implementations may be adapted to Synchronous Rectifiers for modulating turn on time delay and turn off time lead.

Configuration

According to aspects of the present disclosure a Duty Modulator (DM) may be classified as a Duty Reduction Modulator (DRM) which reduces an input duty ratio, a Duty Stretch Modulator (DSM) which increases an input duty ratio, or a full duty modulator (FDM), which can do both.

Figure 3A:
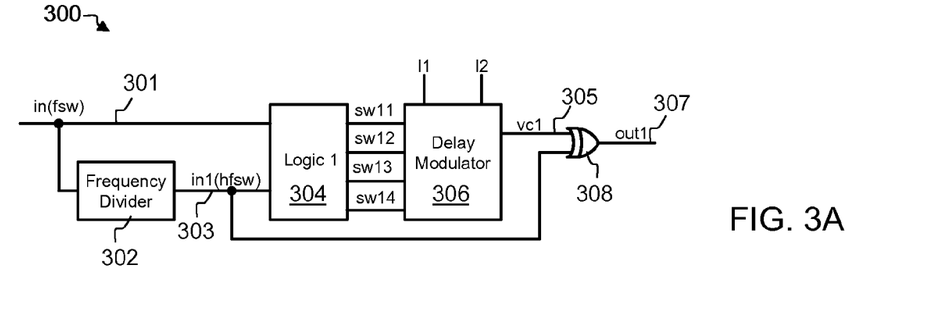
FIG. 3A is a schematic diagram of a Duty Reduction Modulator (DRM) according to an aspect of the present disclosure.
Figure 4:
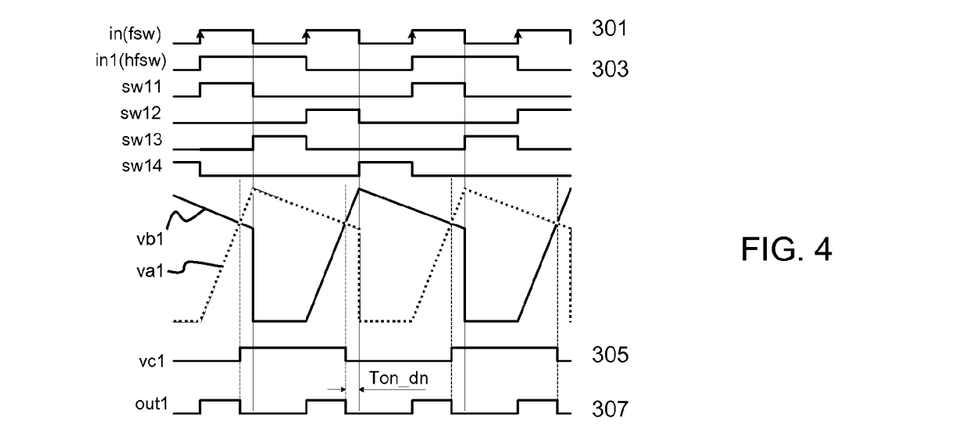
FIG. 4 is a timing diagram showing waveforms at different nodes in FIG. 3A and FIG. 3B.

FIG. 3A illustrates an example of a DRM 300 in accordance with an aspect of the present disclosure. The DRM is configured to reduce a duty ratio of a pulse width modulation (PWM) input signal 301 characterized by an input frequency in (fsw). The DRM 300 generally includes a frequency divider 302, switching logic 304, a delay modulator 306, and an exclusive OR (XOR) gate 308. The frequency divider 302 is configured to receive the input signal 301 and generate a frequency divided signal 303 characterized by a frequency in (hfsw) that is less than the input frequency. By way of example, and not by way of limitation, the frequency of the frequency divided signal 303 may be one-half of the input frequency in (fsw). The first and second timing diagrams shown in FIG. 4 illustrate an example of the relative timing of the input signal 301 and frequency divided signal 303, respectively for such a situation. The switching logic 304 is configured to receive the input signal 301 and the frequency divided signal 303 and generate switching signals that are coupled to the delay modulator 306. The switching logic 304 plays role of 2-bit decoder with 2 inputs and 4 outputs and is designed to follow the 4 switching signals of sw11, sw12, sw13, and sw14 in FIG. 4. By way of example, and not by way of limitation, the switching logic can be easily implemented using a 2-bit decoder, which may include logic gates such as inverter, AND, OR, etc. In alternative implementations, the functions of the switching logic 304 and/or delay modulator 306 may be implemented in software on a microcontroller, albeit somewhat more expensively.

The delay modulator 306 is configured to receive the switching signals and generate a delay modulator output signal 305 having a value vc1 that is high when a first node voltage va1 is greater than a second node voltage vb1 and low otherwise. According to aspects of the present disclosure, the first node voltage va1 has a low value when the input signal 301 and frequency divided signal 303 are both low. The first node voltage va1 increases with a first slope when the input signal and frequency divided signal are both high and decreases with a second slope when one of the input signal and the frequency divided signal is high and the other is low. The second node voltage vb1 has a low value when the input signal 301 is low and the frequency divided signal 303 is high. The second node voltage vb1 increases with the first slope when the input signal 301 is high and the frequency divided signal 303 is low and decreases with the second slope when the input signal and frequency divided signal are both high or when they are both low.

The exclusive XOR gate 308 is configured to receive the delay modulator output signal 305 and the frequency divided signal 303 as its inputs and produce a duty modulated output 307 characterized by a value out1 that is high when one of the XOR gate's inputs is low and the other is high and low otherwise. A duty ratio of the duty modulated output 307 depends on a ratio of the first slope to the second slope.

In the Example depicted in the block diagram in FIG. 3A and the timing diagram shown in FIG. 4 the input PWM signal 301 is applied with 50% duty and its switching frequency, fsw. The frequency divider 304 divides the input PWM frequency by 2. The resulting divided input signal 303 signal follows the rising edge of the input signal 301 and toggles with a period that is twice as long as that of the input signal.

According to an embodiment, the switching logic may be configured generates first, second, third, and fourth DRM switching signals sw11, sw12, sw13, sw14. As may be seen in FIG. 4 the first switching signal sw11 is high when both the input signal 301 and frequency divided signal 303 are high and is low otherwise. The second switching signal sw12 is high when the input signal 301 is high and the frequency divided signal 303 is low and is low otherwise. The third switching signal sw13 is high when the frequency divided signal 303 is high and the input signal 301 is low and is low otherwise. The fourth switching signal sw14 is high when both the input signal 301 and the frequency divided 303 signal are low and is low otherwise.

The delay modulator 306 may be configured to receive the first switching signal sw11, the second switching signal sw12, the third switching signal sw13 and the fourth switching signal sw14. As seen in FIG. 4, the delay modulator 306 may be further configured such that the first node voltage va1 has a low value when the first, second, and third switching signals are low and the fourth switching signal is high, is increasing and characterized by a first slope when the first switching signal sw11 is high and the second, third, and fourth switching signals are low, and decreasing and characterized by a second slope when the first, second, and fourth switching signals are low and the third switching signal sw13 is high.

As seen in FIG. 4, the delay modulator 306 may be further configured such that the second node voltage vb1 has a low value when the first, second, and fourth switches are low and the third switching signal sw13 is high, is increasing and characterized by the first slope when the first, third, and fourth switching signals are low and the second switching signal sw12 is high, and decreasing and characterized by the second slope when the first, second, and third switching signals are low and the fourth switching signal sw14 is high.

Figure 3B:
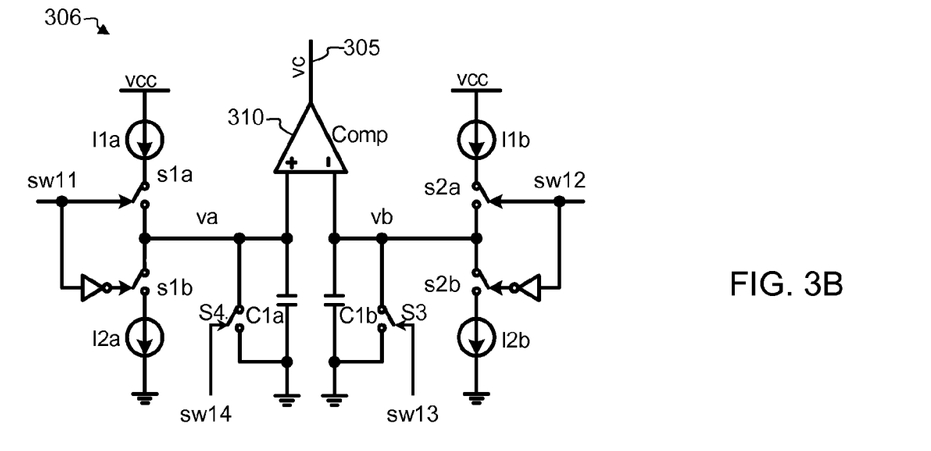
FIG. 3B is a block diagram of a Delay Modulator according to an aspect of the present disclosure.

There are a number of different ways in which to configure the delay modulator 306 to produce the desired delay modulator output signal 305. By way of example, and not by way of limitation, the delay modulator 306 may include a comparator 310, as shown in FIG. 3B. The comparator may be configured to receive the first and second node voltages va1, vb1 as inputs and generate the delay modulator output 305.

There are a number of different ways in which to configure the delay modulator 306 to produce the desired node voltages va1, vb1. By way of example, and not by way of limitation, as shown in FIG. 3B, the delay modulator 306 may include first and second switches s1a, s1b controlled by the first switching signal sw11 such that the first switch s1a is closed when the second switch s1b is open and vice versa. The delay modulator 306 may further include third and fourth switches s2a, s2b controlled by the second switching signal sw12 such that the third switch s2a is closed when the fourth switch s2b is open and vice versa. The delay modulator 306 may also include a fifth switch s3 controlled by the third switching signal sw13, and a sixth switch s4 controlled by the fourth switching signal sw14.

As seen in FIG. 3B the first switch s1a may be electrically coupled to the second switch s1b and a junction between the first and second switches may be electrically coupled to the first node va. Similarly, the third switch s2a may be electrically coupled to the fourth switch s2b and a junction between the third and fourth switches may be electrically coupled to the second node vb. The fifth switch s3 and a first capacitor C1b may be coupled in parallel between the second node vb and ground and the sixth switch s4 and a second capacitor C1a may be coupled in parallel between the first node va and ground. The comparator 310 compares the voltage levels of the capacitors and nodes va and vb. The capacitors may have the same capacitance value.

A first current source I1a may be configured to provide a first current between a source of common voltage Vcc and the first switch s1a and a second current source I1b may be similarly configured to provide a second current between the source of common voltage Vcc and the third switch s2a. A third current source I2a may be configured to provide a third current between the second switch s1b and ground, and a fourth current source I2b configured to provide a fourth current between the fourth switch s2b and ground. The first and second currents may be both equal to a first current value I1 and the third and fourth currents may be equal to a second current value I2. Those skilled in the art will appreciate that in such a configuration, the duty ratio of the duty modulated output 307 depends on a ratio of the first current value I1 to the second current value I2.

By referring to FIG. 3B and FIG. 4, it may be seen that the Delay Modulator 306 has a bilateral symmetric configuration. The input signals sw11, sw12, sw13, sw14 generated by the switching logic 304 control the switches s1a, s1b, s2a, s2b, s3, s4 to charge or discharge the capacitors C1a, C1b. The input signals of sw11, sw12, sw13 and sw14 generated by the switching logic 304 causing the capacitors C1a, C1b to charge or discharge. The current ratio of the charging currents I1(=I1a=I1b) and discharging current I2(=I2a=I2b) determine the duty ratio of the duty modulated output 307.

As may be seen from FIG. 3B, the rate at which the capacitors C1a, C1b charge depends on I1 and the rate at which they discharge depends on I2. If I1 is fixed the rising slope of each node may be kept constant but if I2 is variable the falling slopes of them are followed. Therefore the off-time duration of the output vc1 from the comparator 310 increases if I2 increases, which increases the turn-off time delay Ton_dn. Similarly, the off-time duration of output vc1 and the turn-off time delay Ton_dn both decrease if I2 decreases.

FIG. 4 shows the waveforms of each node in FIG. 3A and FIG. 3B. As noted above, these waveforms depend on the ratio of I1 to I2. In general, I2 must not be higher than I1 or lower than 0. As I2 increases, the turn-on time of the duty modulated output 307 decreases. In particular, the timing diagrams shown in FIG. 4 from top to bottom depict waveforms for input signal 301, the frequency divided signal 303, the switching signals sw11, sw12, sw13, sw14 from the switching logic 304, the node voltages va1, vb1 for the delay Modulator 306, the delay modulator output 305 and the duty modulated output 307 from the XOR gate. For the purposes of example, and not limitation, FIG. 4 shows waveforms for a configuration of a DRM in which I2=0.8*I1.

A number of features the operation of the DRM 300 may be appreciated from FIG. 3B and FIG. 4. Specifically, the second node voltage vb1 (solid line) drops rapidly when the fifth switch s3 is turned on, e.g., when sw13 goes high. The first node voltage va1 (dashed line) starts to discharge slowly due to I2 when the first switching signal sw11 goes low. The input signal 301 rises the second switching signal sw12 goes high. The second node voltage vb1 then starts to increase at a rate determined by I1b. When va1=vb1, vc1 switches from low to high or high to low. As may be seen va1 and vb1 are the same waveform 180 degrees out of phase. The output of the XOR gate 308 is high when the delay modulator output 305 (vc1) and the frequency divided input signal 303 are different and is low when they are the same.

It is noted that fixed steady state duty ratio operation starts after one clock cycle of operation of the DRM 300. In other words, it takes one clock cycle to set up the desired turn-on time decrease Ton_dn.

Figure 5A:
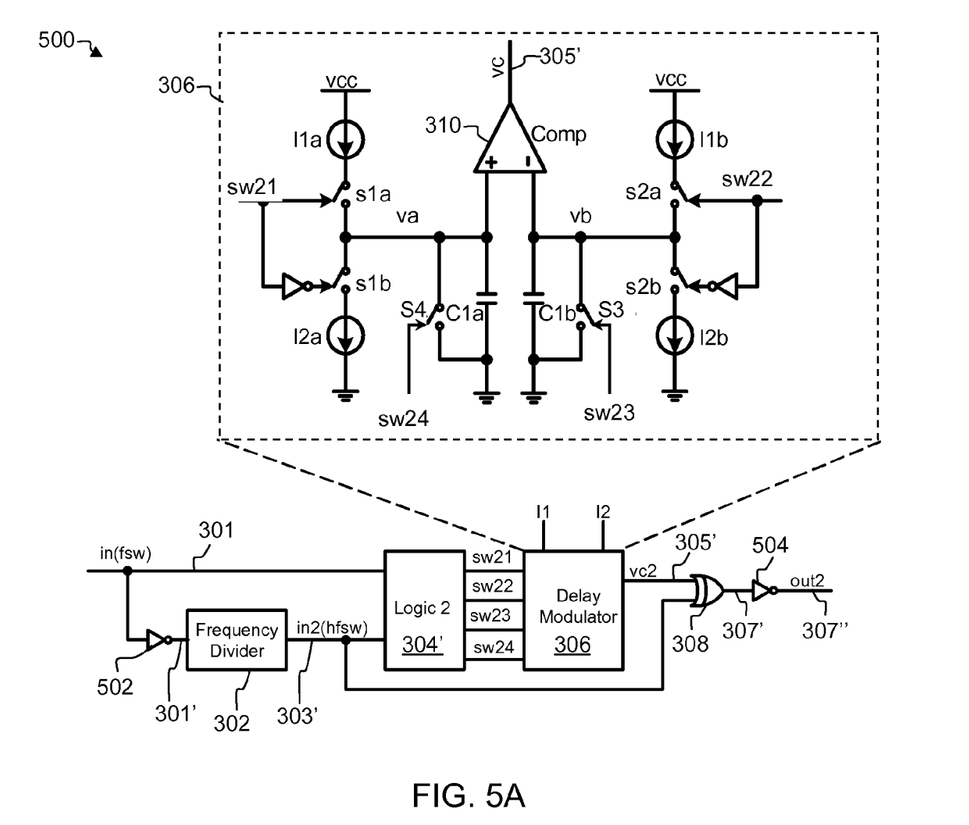
FIG. 5A is a block diagram of a Duty Stretch Modulator (DSM) according to an aspect of the present disclosure.
Figure 5B:
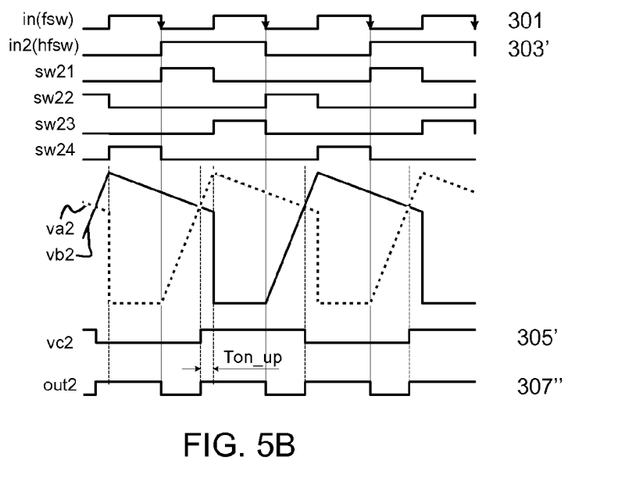
FIG. 5B is a timing diagram showing waveforms at different nodes in FIG. 5A

FIG. 5A and FIG. 5B illustrate an example of a Duty Stretch Modulator (DSM) 500 according to an aspect of the present disclosure. The DSM 500 is very similar to the DRM 300 of FIG. 3A. However, in addition to the previously described frequency divider 302, logic circuit 304', delay modulator 306 and exclusive OR (XOR) gate 308, the DSM 500 includes two inverter gates 502, 504. A first inverter gate is coupled to the input to the frequency divider 302 and a second inverter gate is connected to the output of the XOR gate 308. The delay modulator 306 in the DRM 500 may have the same configuration as the delay modulator 306 of FIG. 3B.

In the example illustrated in FIG. 5A and FIG. 5B, the input PWM signal, 301, characterized by an input switching frequency (fsw) and a 50% duty cycle, is inverted by the first inverter 502. The frequency divider 302 receives the resulting inverted input signal 301' and produces a frequency divided inverted signal 303' having a frequency (hfsw) that is half of the switching frequency (fsw). The frequency divided inverted signal 303' follows the falling edge of the input signal 301 and is toggled with a period that is twice as long as the input signal. The (un-inverted) input signal 301 and the inverted frequency divided input signal 303' become inputs of a DSM logic circuit 304', which produces four DSM switching signals sw21, sw22, sw23 and sw24, which are coupled as inputs to the delay modulator 306. The delay modulator produces a delay modulator output signal 305' having a value vc2 that is fed to the XOR gate 308, along with the frequency divided inverted signal 303' as inputs. The second inverter 504 inverts the resulting output 307' of the XOR gate 308 to generate a final output 307'. Although the delay modulator 306 may be the same as in FIG. 3A, the DSM logic circuit 304' in FIG. 5A may be somewhat similar to the DRM logic circuit 304 in FIG. 3B, but produces different switching signals for the delay modulator 306 than the DRM switching signals in the DRM 300.

As with the switching logic 304 of FIG. 3, the switching logic 304' may be implemented using a slightly different 2-bit decoder, which may include logic gates such as inverter, AND, OR, etc. In alternative implementations, the functions of the switching logic 304' and/or delay modulator 306 may be implemented in software on a microcontroller, albeit somewhat more expensively.

The timing diagram in FIG. 5B shows waveforms for the input signal 301, frequency divided input 303', DSM switching signals sw21, sw22, sw23 and sw24, node voltages va2,vb2, and comparator output vc2 for the DSM of FIG. 5A. These waveforms depends on the ratio of I1 and I2, where it is again assumed that I1a=I1b=I1 and I2a=I2b=I2, as discussed above. I2 is not higher than I1 or lower than 0. The higher I2 is the longer turn-on time increment Ton_up becomes. For the purposes of example and not of limitation a relationship between I1 and I2 of I2=0.8*I1 is shown.

In FIG. 5B, the capacitor charging and discharging speed relies on I1 and I2. If I1 is fixed the rising slope of each node is constant but if I2 is variable the falling slopes of them are followed. Therefore the on-time duration of the output vc2 of the comparator 310 and the turn-on time increment Ton_up increase if I2 increases and decrease if I2 decreases.

Figure 6A:
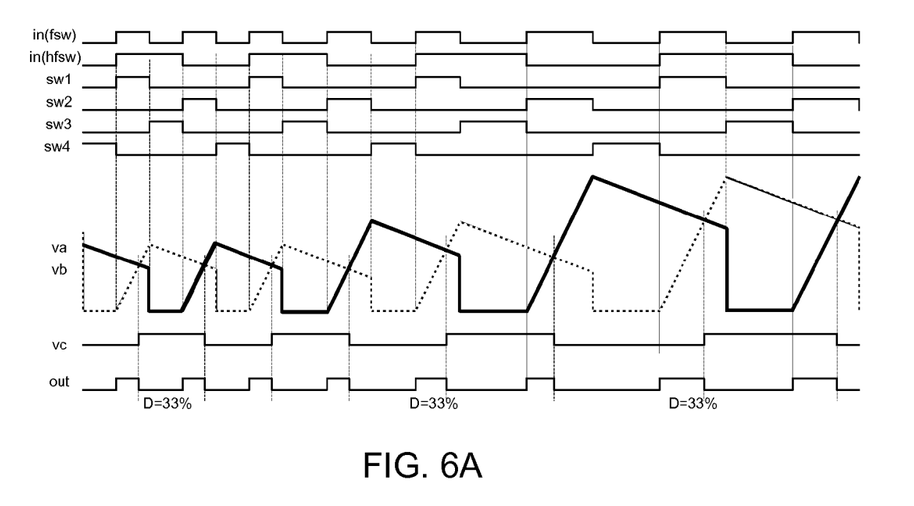
FIG. 6A is a timing diagram illustrating a constant Duty Ratio with changing input frequency in accordance with aspects of the present disclosure.

Aspects of the present disclosure are useful in applications for which PWM frequency is not fixed. The timing diagrams in FIG. 6A shows how a constant duty ratio may be maintained even though the input frequency is changed. As may be seen in FIG. 6A, the switching signals change accordingly as the PWM frequency decreases (i.e., as the pulse period increases). Consequently, the capacitors C1a, C1b begin charging and discharging at fixed relative phases within a pulse cycle. As a result of the increased pulse period, the charging times for the capacitors C1a, C1b increase and the node voltages va, vb correspondingly increase. However, because of the way these voltages depend on the I2/I1 current ratio, the comparator output voltage vc switches with the same duty independent of the pulse frequency. The duty can be changed just by changing the I2/I1 current ratio.

Figure 6B:
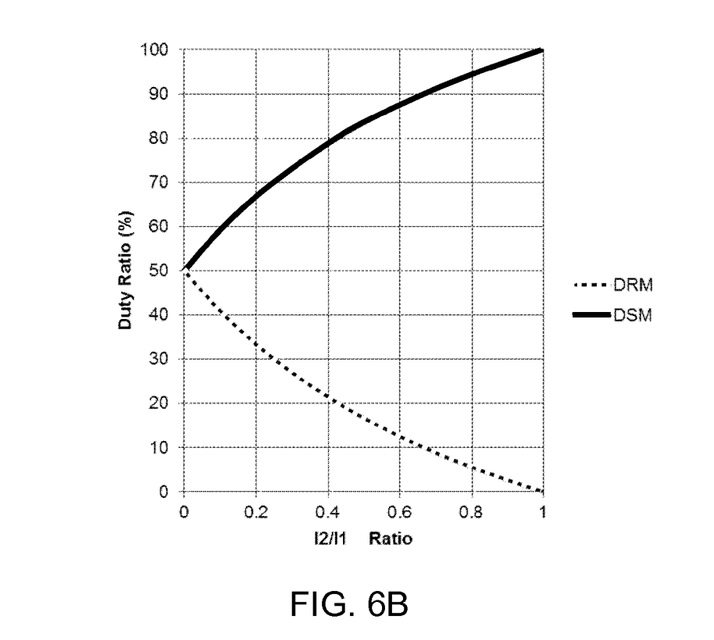
FIG. 6B is a graph showing the relation between Duty cycle and I2/I1 ratio in DRM and DSM in accordance with aspects of the present disclosure.

FIG. 6B shows the relation between Duty and I2/I1 ratio and the duty in DRM 300 can be modulated in the range of 0% to ~50% and the Duty ratio in DSM 500 can be varied in a range of 50% to ~100%.

Figure 7A:
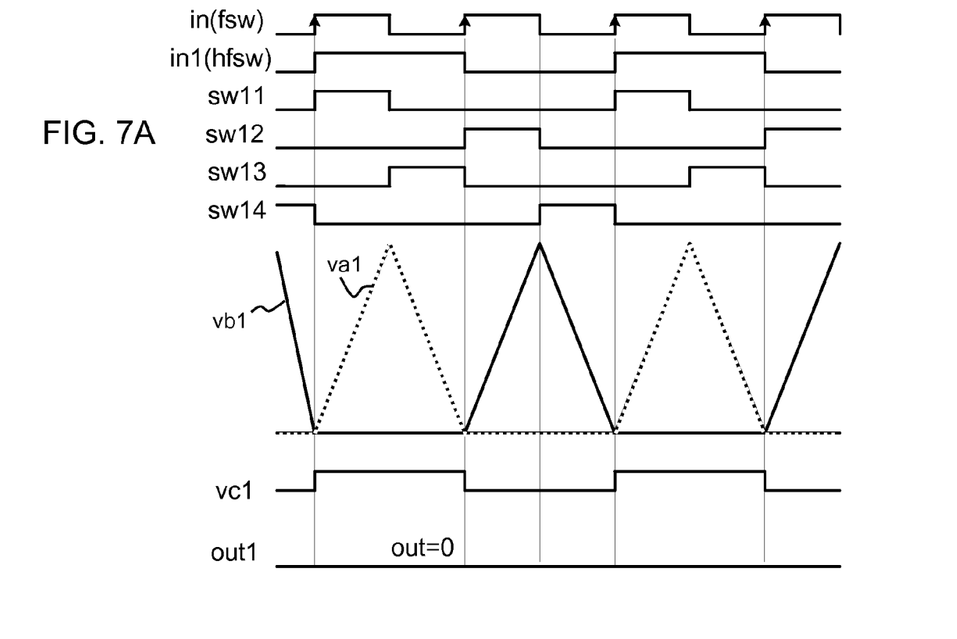
FIG. 7A is a timing diagram illustrating maximum duty modulation with a Duty Reduction Modulator according to an aspect of the present disclosure.
Figure 7B:
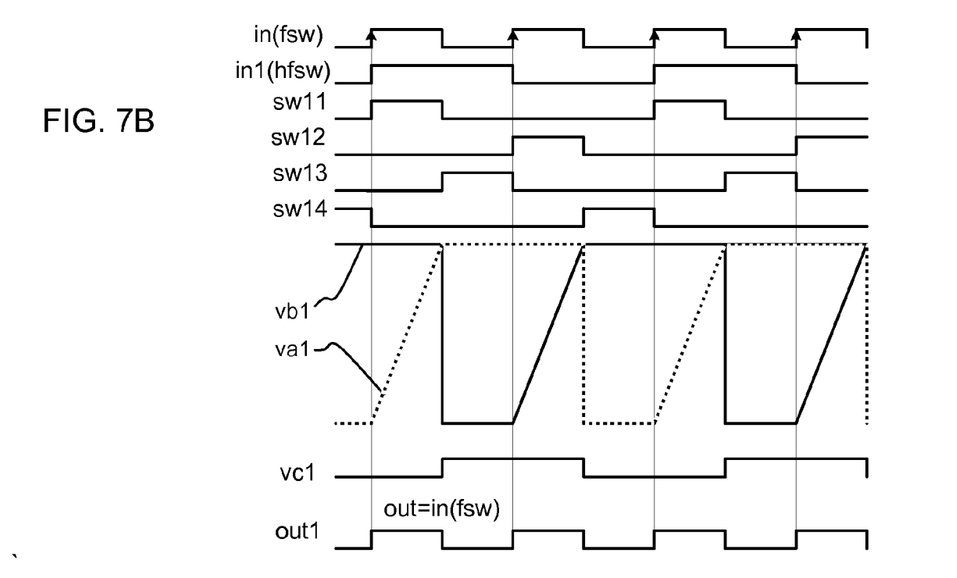
FIG. 7B is a timing diagram illustrating minimum duty modulation with a Duty Reduction Modulator according to an aspect of the present disclosure.

FIGS. 7A-7B illustrate how much duty reduction is possible by DRM 300. As shown in FIG. 7A, maximum duty modulation occurs if I2a=I2b=I2 is the same as I1a=I1b=I1. In the illustrated example, an input PWM duty cycle of 50% can be modulated to 0%, if I1=I2. In FIG. 7B, minimum duty modulation occurs if I2a=I2b=0 A, that is, if there is no discharging current, there is no reduction in the input duty cycle, which is 50% in this example.

Figure 8A:
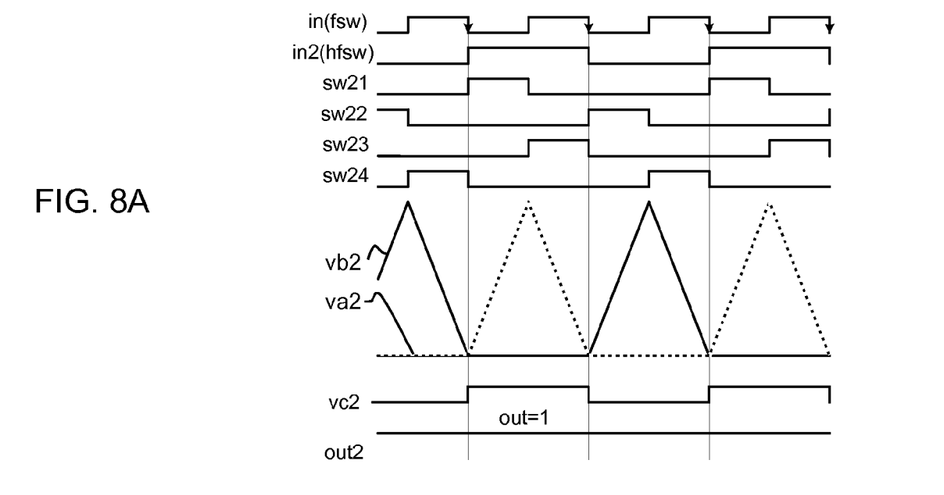
FIG. 8A is a timing diagram illustrating maximum duty modulation with a Duty Stretch Modulator according to an aspect of the present disclosure.
Figure 8B:
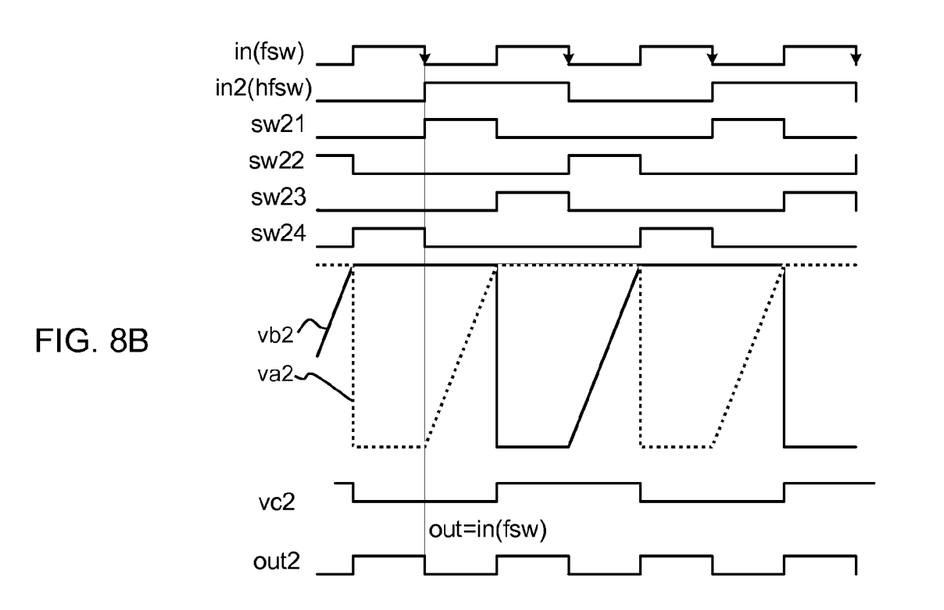
FIG. 8B is a timing diagram illustrating minimum duty modulation with a Duty Stretch Modulator according to an aspect of the present disclosure.

FIGS. 8A-8B illustrate how much duty variation is possible by DSM 500. As shown in FIG. 8A, maximum duty modulation occurs if I2a=I2b=I2 is the same as I1a=I1b=I2. In the illustrated example an input PWM duty cycle of 50% can be modulated up to 100%, if I1=I2. As shown in FIG. 8B, minimum duty modulation occurs if I2a=I2b=0 A, that is, no discharging current. There is no duty reduction from the input duty cycle of 50% in this example.

Eq. 1 shows the relation of the duty time reduction and Eq. 2 does the duty equation according to the ratio of I2 and I1 in DRM.

$$\Delta T_{on\_dn} = T \cdot \left(1 - \frac{1}{1 + \frac{I2}{I1}}\right) \qquad \text{Eq. 1}$$

$$\text{Duty}_{DRM} = \frac{0.5T - \Delta T_{on\_dn}}{T} = 1 - \frac{1}{1 + \frac{I2}{I1}} - 0.5 \qquad \text{Eq. 2}$$

Eq. 3 shows the relation of the duty time reduction and Eq. 4 does the duty equation according to the ratio of I2 and I1 in DSM.

$$\Delta T_{on\_up} = T \cdot \left(1 - \frac{1}{1 + \frac{I2}{I1}}\right) \qquad \text{Eq. 3}$$

$$\text{Duty}_{DSM} = \frac{0.5T + \Delta T_{on\_up}}{T} = 1.5 - \frac{1}{1 + \frac{I2}{I1}} \qquad \text{Eq. 4}$$

Figure 9:
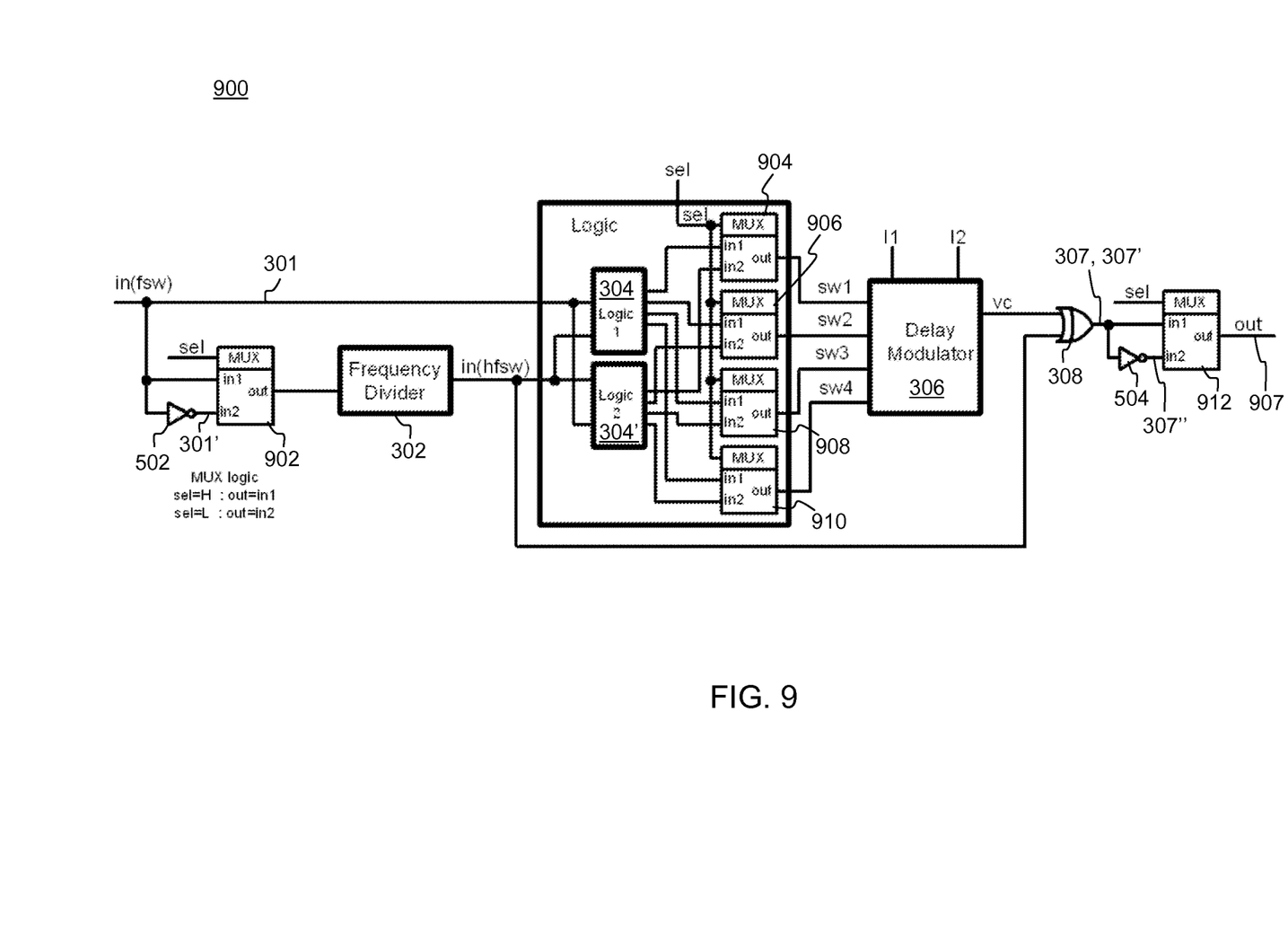
FIG. 9 is a block diagram depicting a full duty modulator that incorporates a DRM and DSM using Multiplexer (MUX) according to aspects of the present disclosure.

Aspects of the present disclosure include duty modulator implementations that incorporate features of both a DRM of the type shown in FIG. 3A and a DSM of the type shown in FIG. 5A. By way of example, and not by way of limitation, FIG. 9 shows a full duty modulator (FDM) 900 in which the functions of a DRM and a DSM are merged using multiplexers, whose output can select either a DRM function or a DSM function according to a selection signal "sel".

Specifically, the FDM 900 includes a frequency divider 302, DRM logic circuit 304, delay modulator 306, and XOR gate 308. These components may be configured as described above with respect to FIG. 3A and FIG. 3B. In addition, the FDM 900 includes inverters 502, 504 and a DSM logic circuit 304', which may be configured as described above with respect to FIG. 5A and FIG. 5B. In particular, the DRM logic circuit 304 may produce DRM switching signals sw11, sw12, sw13, sw14, and the DSM logic circuit 304' may produce DSM switching signals sw21, sw22, sw23, sw24, as described above. The FDM 900 further includes one or more switching multiplexers that select between DRM and DSM operation in response to a common selection signal sel. The one or more switching multiplexers are configured to selectively couple the DRM switching signals to the delay modulator when the input multiplexer couples the input signal to the frequency divider and wherein the one or more switching multiplexers are configured to couple the DSM switching signals to the delay modulator when the input multiplexer couples the inverted input signal to the frequency divider.

In the illustrated example, the multiplexers include an input multiplexer 902, one or more switching multiplexers 904, 906, 908, 910, and an output multiplexer 912. As used herein, and as generally understood by those of skill in the art, multiplexer (or mux) is a device that selects one of two or more analog or digital input signals and forwards the selected input into a single line. Like the logic circuits 304, 304', the multiplexers 902, 904, 906, 908, 910, 912 may be implemented using a suitable configuration of switches or logic gates such as inverters, AND gates, OR gates, etc. Alternatively, the multiplexer functions may be implemented in software, e.g., using microcontrollers, albeit somewhat more expensively.

The input multiplexer 902 is configured to selectively couple either the input signal 301 (input 1) or the inverted input signal 301' (input 2) from the first inverter 501 to the frequency divider 302. The one or more switching multiplexers are configured to selectively couple the DRM switching signals sw11, sw12, sw13, sw14 to the delay modulator 306 when the input multiplexer 902 couples the input signal 301 to the frequency divider 302. In addition, the one or more switching multiplexers are configured to selectively couple the DSM switching signals sw21, sw22, sw23, sw24 to the delay modulator 306 when the input multiplexer 902 couples the inverted input signal 301' to the frequency divider 302.

In the illustrated example there are four switching multiplexers 904, 906, 908, and 910 configured to select DSM or DRM signals sw11 or sw21, sw12 or sw22, sw13 or sw23, and sw14 or sw24, as input 1 or input 2 respectively. The selected input switching signals are coupled to the delay modulator 306 as outputs identified as sw1, sw2, sw3, and sw4, respectively in FIG. 9. The delay modulator also receives the currents I1, I2, which control the duty ratio as described above.

The output multiplexer 912 receives the duty modulated output 307, from the XOR 308 as input 1 and receives the inverted duty modulated output 307" from the second inverter 504 as input 2. The output multiplexer 912 is configured to selectively output the duty modulated output 307 from the XOR gate 308 as the final output 907 when the input multiplexer 902 couples the input signal 301 to the frequency divider 302. The output multiplexer 902 is also configured to selectively output the inverted duty modulated output 307' as the final output 907 when the input multiplexer 902 couples the inverted input signal 301' to the frequency divider 302.

The multiplexers 902, 904, 906, 908, 910, 912 may be configured so that the FDM 900 can selectively operate as either a DRM or a DSM depending on the selection signal sel. By way of example and not by way of limitation, each of the multiplexers 902, 904, 906, 908, 910, 912 may operate according to multiplexer logic for which the output of the multiplexer is input 1 when the selection signal sel is high and for which the output of the multiplexer is input 2 when the selection signal sel is low.

Aspects of the present disclosure allow for a simple and inexpensive apparatus that allows for selectable PWM duty ratio that remains stable as the PWM frequency changes through modulation of the turn-on and turn-off time. Such an apparatus can be adapted, e.g., for use with Synchronous Rectifiers of LLC converters. It is noted that aspects of the present disclosure are not limited to the implementations described above. By way of example, and not by way of limitations, the functions of two or more of the frequency divider 302, DRM logic 304, DSM logic 304', the delay modulator 306, the XOR gate 308, inverters 502, 504 and multiplexers 902, 904, 906, 908, 910, 912 may be implemented into a single hardware element. By way of further example, and not by way of limitation, the functions of one or more of the frequency divider 302, DRM logic 304, DSM logic 304', the delay modulator 306, the XOR gate 308, inverters 502, 504 and multiplexers 902, 904, 906, 908, 910, 912 may be implemented in software.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A duty modulator apparatus, comprising:
   a frequency divider, configured to receive an input signal having an input frequency and generate a frequency divided signal having a frequency that is less than the input frequency;
   switching logic configured to receive the input signal and the frequency divided signal and generate switching signals;
   a delay modulator configured to receive the switching signals and generate a delay modulator output signal that is high when a first node voltage is greater than a second node voltage and low otherwise; and
   an exclusive OR (XOR) gate configured to receive the delay modulator output signal and the frequency divided signal as its inputs and produce a duty modulated output that is high when one of its inputs is low and the other is high and low otherwise, wherein a duty ratio of the duty modulated output depends on a ratio of a slope of the first node voltage to a slope of the second node voltage.

2. The apparatus of claim 1, wherein the first node voltage has a low value when the input signal and frequency divided signal are both low, is increasing with a first slope when the input signal and frequency divided signal are both high, and is decreasing with a second slope when one of the input signal and the frequency divided signal is high and the other is low.

3. The apparatus of claim 2, wherein the second node voltage has a low value when the input signal is low and the frequency divided signal is high, is increasing with the first slope when the input signal is high and the frequency divided signal is low, and is decreasing with the second slope when the input signal and frequency divided signal are both high or when they are both low.

4. The apparatus of claim 1 wherein the switching logic is configured generate first, second, third, and fourth switching signals, wherein the first switching signal is high when both the input signal and frequency divided signal are high and low otherwise, wherein the second switching signal is high when the input signal is high and the frequency divided signal is low and low otherwise, wherein the third switching signal is high when the frequency divided signal is high and the input signal is low and low otherwise, and wherein the fourth switching signal is high when both the input signal and the frequency divided signal are low and low otherwise.

5. The apparatus of claim 4 wherein the delay modulator is configured to receive the first, second, third and fourth switching signals, wherein the first node voltage has a low value when the first, second, and third switching signals are low and the fourth switching signal is high, is increasing and characterized by a first slope when the first switching signal is high and the second, third, and fourth switching signals are low, decreasing and characterized by a second slope when the first, second, and fourth switching signals are low and the third switching signal is high, and
wherein the second node voltage has a low value when the first, second, and fourth switches are low and the third switching signal is high, is increasing and characterized by the first slope when the first, third, and fourth switching signals are low and the second switching signal is high, decreasing and characterized by the second slope when the first, second, and third switching signals are low and the fourth switching signal is high.

6. The apparatus of claim 5, wherein the delay modulator includes a comparator configured to receive the first and second node voltages as inputs and generate the delay modulator output.

7. The apparatus of claim 5 wherein the delay modulator includes first and second switches controlled by the first switching signal such that the first switch is closed when the second switch is open and vice versa, third and fourth switches controlled by the second switching signal such that the third switch is closed when the fourth switch is open and vice versa, a fifth switch controlled by the third switching signal, and a sixth switch controlled by the fourth switching signal.

8. The apparatus of claim 7 wherein the first switch is electrically coupled to the second switch and a junction between the first and second switches is electrically coupled to the first node, wherein the third switch is electrically coupled to the fourth switch and a junction between the third and fourth switches is electrically coupled to the second node.

9. The apparatus of claim 8 wherein the fifth switch and a first capacitor are coupled in parallel between the second node and ground and the sixth switch and a second capacitor are coupled in parallel between the second node and ground.

10. The apparatus of claim 9, further comprising a first current source configured to provide a first current between a common voltage and the first switch, a second current source configured to provide a second current between the common voltage and the third switch, a third current source configured to provide a third current between the second switch and ground, and a fourth current source configured to provide a fourth current between the fourth switch and ground.

11. The apparatus of claim 10, wherein the first and second currents are both equal to a first current value and the third and fourth currents are equal to each a second current value, wherein the duty ratio of the output signal depends on a ratio of the first current value to the second current value.

12. The apparatus of claim 1 wherein the apparatus is configured as a duty reduction modulator for which the ratio of the duty modulated output is greater than or equal to zero and less than or equal to a duty ratio of the input signal.

13. The apparatus of claim 1 wherein the apparatus is configured as a duty stretch modulator for which the ratio of the duty modulated output is greater than or equal to a duty ratio of the input signal and less than or equal to one.

14. The apparatus of claim 13, further comprising an inverter configured to invert the input signal that is input to the frequency divider.

15. The apparatus of claim 14, further comprising an additional inverter configured to invert the duty modulated output from the XOR gate.

16. The apparatus of claim 1 wherein the apparatus is configured to selectively operate as either a duty reduction modulator (DRM) for which the ratio of the duty modulated output is greater than or equal to zero and less than or equal to a duty ratio of the input signal or as a duty stretch modulator (DSM) for which the ratio of the duty modulated output is greater than or equal to a duty ratio of the input signal and less than or equal to one.

17. The apparatus of claim 16, further comprising a first inverter configured to receive and invert the input signal and produce an inverted input signal and an input multiplexer configured to receive the input signal and the inverted input signal, wherein the input multiplexer is configured to selectively couple either the input signal or the inverted input signal to the frequency divider.

18. The apparatus of claim 17, wherein the switching logic includes a duty reduction modulator (DRM) logic configured to produce DRM switching signals and a duty stretch modulator (DSM) configured to produce DSM switching signals.

19. The apparatus of claim 18, further comprising one or more switching multiplexers configured to selectively couple the DRM switching signals to the delay modulator when the input multiplexer couples the input signal to the frequency divider and wherein the one or more switching multiplexers are configured to couple the DSM switching signals to the delay modulator when the input multiplexer couples the inverted input signal to the frequency divider.

20. The apparatus of claim 19, further comprising a second inverter configured to receive and invert the duty modulated output from the XOR gate to produce an inverted duty modulated output and an output multiplexer configured to receive the duty modulated output and the inverted duty modulated output.

21. The apparatus of claim 20, wherein the output multiplexer is configured to output the duty modulated output from the XOR gate when the input multiplexer couples the input signal to the frequency divider and wherein the output multiplexer is configured to output the inverted duty modulated output when the input multiplexer couples the inverted input signal to the frequency divider.

22. The apparatus of claim 21, wherein the input multiplexer, the one or more switching multiplexers, and the output multiplexer are responsive to a common selection signal.

* * * * *